H. MÜLLER.
COOLING DEVICE FOR MILK CANS.
APPLICATION FILED FEB. 7, 1913.
1,199,593.
Patented Sept. 26, 1916.
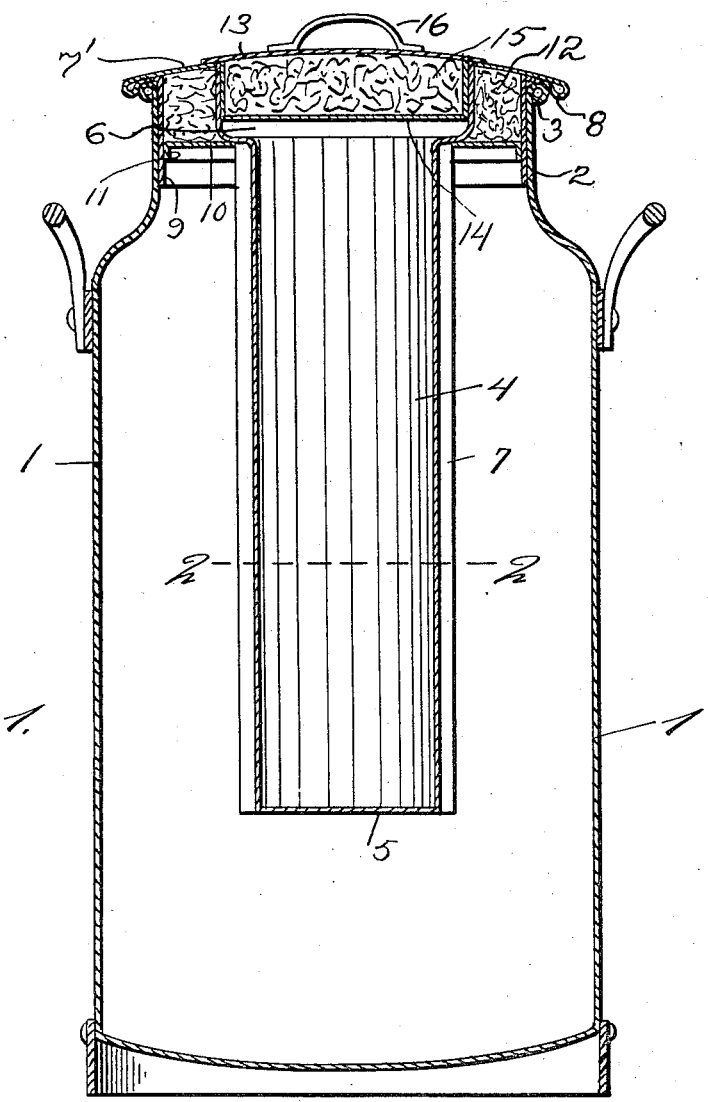
Fig. 1.
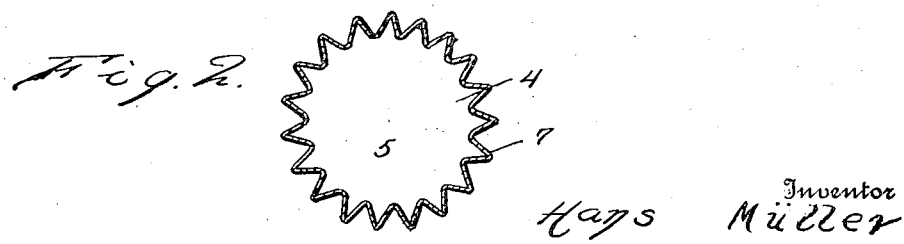
Fig. 2.
Witnesses
J. Milton Jester
Rodney M. Smith.
Inventor
Hans Müller
By A. Randolph Jr.
Attorney

UNITED STATES PATENT OFFICE.

HANS MÜLLER, OF ZURICH, SWITZERLAND, ASSIGNOR TO CONRAD SCHALTEGGER, OF NEW YORK, N. Y.

COOLING DEVICE FOR MILK-CANS.

1,199,593.     Specification of Letters Patent.     Patented Sept. 26, 1916.

Application filed February 7, 1913. Serial No. 746,914.

*To all whom it may concern:*

Be it known that I, HANS MÜLLER, a citizen of the Republic of Switzerland, residing at Zurich, in the Canton of Zurich and Republic of Switzerland, have invented certain new and useful Improvements in Cooling Devices for Milk-Cans, of which the following is a specification.

This invention relates to improvements in milk cooling devices and comprehends more particularly improvements in milk cooling devices which are especially adapted for use in connection with milk cans or similar containers.

The primary object of the invention resides in the provision of a milk cooling device which is adapted to be positioned within a milk can to close the same and receive a cooling substance, such as ice.

A more specific object of the invention is to provide a milk cooling device, comprising a cylindrical body portion closed at its inner end and formed with a pocket about its outer end to receive a non-conducting material, and a cap member fitting within said body portion.

The invention also aims to generally improve devices of this nature to render them more efficient, useful, and commercially desirable.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a longitudinal sectional view through my invention, showing the same applied to a milk can, and Fig. 2 is a transverse sectional view taken on the plane of line 2—2 of Fig. 1.

Referring in detail to the drawings by numerals, 1 designates a milk can of the ordinary construction, having a neck portion 2 of a somewhat reduced diameter and formed with the usual bead 3.

My improved milk cooling device comprises a cylindrical container 4, having its inner end closed by the wall 5 and enlarged adjacent its outer end, as indicated at 6. The container 4 is formed with the longitudinal ribs or corrugations 7, which terminate at the shoulder 4ª defined by the enlarged portion 6 and which greatly strengthen and improve the efficiency of my device. A flange 7' is secured to the outer open end of the receptacle and extends outwardly and downwardly, as clearly shown in the drawings, and has its marginal portion turned under, as indicated at 8, for engagement with the bead 3, whereby the cooling device is supported in the milk can. A flange or annular ring 9 is soldered or otherwise secured to the under surface of the flange 7' against the turned edge 8 and fits within the neck of the milk can. An annular ring 10, having the flange 11, is arranged in spaced relation to the flange 7', forming a pocket for the reception of suitable non-heat conducting material, indicated by the numeral 12. The inner edge of the ring 10 is secured to the shoulder 4ª and the outer flanged edge 11 thereof is secured to the neck-engaging ring 9, thereby materially increasing the strength and rigidity of the latter.

The neck or enlarged portion 6 of the body portion 4 is adapted to be closed by a flanged cap 13, which has its inner end closed by the wall 14 so as to form a chamber for any suitable non-heat conducting material 15. The cap 13 is provided with a handle 16, the use of which is obvious.

In using my improved cooling device, ice or any preferred cooling substance is placed within the body portion 4, after which the parts are arranged, as shown in Fig. 1. The non-conducting substances 12 and 15 act to produce a very efficient device and one which will cool the milk with the use of a minimum amount of ice. The device also forms a cover for the milk can and thereby serves a double function.

It will be noted that my improved cooling device may be very cheaply manufactured and is applicable to the common types of milk cans now in use.

It is to be understood that while I have shown and described the preferred embodiment of my invention, I do not wish to be limited to this exact construction, combination, and arrangement of parts, but may make such changes as will fall within the spirit and scope of the invention.

Having thus described my invention, what I claim is:—

A milk can having a restricted neck, a cooling device removably mounted in the can, said cooling device including a cylindrical body having an enlarged upper end defining an annular shoulder, a laterally projecting flange carried by the upper edge of the enlarged end and having the outer edge turned under for engagement with the upper edge of the neck of the can, a ring adapted to engage in the neck of the can secured to the under side of the flange and against the turned under edge thereof and disposed in spaced relation to the enlarged end of said cylindrical body, an annular ring having the inner edge secured to said shoulder, a flange formed at the outer edge of the second mentioned ring secured adjacent the lower edge of the first-mentioned ring, non-heat conducting material arranged in the space between the flange, enlarged end of the cylindrical body and the first and second mentioned rings, and a cap removably fitted in the enlarged end of the cylindrical body.

In testimony whereof I affix my signature in presence of two witnesses.

HANS MÜLLER.

Witnesses:
CARL GUBLER,
ROGER AMES BURR.